United States Patent [19]

Lebsock

[11] Patent Number: 4,561,681
[45] Date of Patent: Dec. 31, 1985

[54] ROTARY UNION FOR HIGH PRESSURE GAS

[75] Inventor: Robert A. Lebsock, Las Cruces, N. Mex.

[73] Assignee: The United States of America as represented by the Secretary of the Army, Washington, D.C.

[21] Appl. No.: 488,501

[22] Filed: Apr. 25, 1983

[51] Int. Cl.⁴ ............................................. F16L 27/00
[52] U.S. Cl. ..................................... 285/276; 285/14; 285/111; 285/351
[58] Field of Search ................. 285/276, 275, 111, 14, 285/351

[56] References Cited

U.S. PATENT DOCUMENTS

| | | | |
|---|---|---|---|
| 3,290,068 | 12/1966 | Jackson | 285/276 |
| 3,468,564 | 9/1969 | Frohlich | 285/276 X |
| 3,630,533 | 12/1971 | Butler et al. | 285/111 X |

FOREIGN PATENT DOCUMENTS 2311978  12/1976  France ................................. 285/276

Primary Examiner—Richard J. Scanlan, Jr.
Attorney, Agent, or Firm—Saul Elbaum; Alan J. Kennedy; Anthony T. Lane

[57] ABSTRACT

A high pressure rotary union includes a housing enclosing a hollowed shaft. A seal enclosure is keyed within the housing and receives a sealing ring which is biased by a circular spring to maintain low friction intimate sealing engagement between the ring and shaft despite minor eccentric shaft displacement.

9 Claims, 2 Drawing Figures

ROTARY UNION FOR HIGH PRESSURE GAS

RIGHTS OF THE GOVERNMENT

The invention described herein may be manufactured, used, and licensed by or for the United States Government for governmental purposes without the payment to me of any royalty thereon.

FIELD OF THE INVENTION

The present invention relates to rotating couplings for fluids (liquids and gases), and more particularly to such a coupling capable of withstanding relatively high pressures.

BRIEF DESCRIPTION OF THE PRIOR ART

The prior art includes a rotating union which is capable of withstanding relatively high pressures. Such a device is manufactured by Deublin, Inc., of Northbrook, Ill., and is designated by the Model No. 1106. Such a device includes an enclosure, a rotating shaft which serves as a rotor through which high pressure gas or liquid may pass. A floating seal, in the nature of a carbon graphite member and a confronting surface of the shaft are micro-lapped to effect sealing therebetween while permitting relative rotation. The sealing effect ensures that high pressure gas or liquid may pass through the union without leaking.

A major disadvantage of the prior art union is the relatively high degree of friction which occurs between the micro-lapped seal faces. This, of course, limits the operational characteristics of the device. Further, the utilization of carbon graphite material results in a rather costly device which becomes more expensive to manufacture due to the confronting micro-lapped seal faces.

BRIEF DESCRIPTION OF THE INVENTION

The present invention is an improvement of the described type of union. By utilizing a different type of sealing arrangement between the rotating shaft and stationary portions of the union, less friction is encountered so that the union becomes more reliable. Further, the torque required to turn the shaft of the present union is less than that of the prior art device. A final advantage is the relatively low cost of fabrication due to the inexpensive materials used as well as the lack of expensive machining.

The above-mentioned objects and advantages of the present invention will be more clearly understood when considered in conjunction with the accompanying drawings, in which:

DETAILED DESCRIPTION OF THE INVENTION

Figure 1:
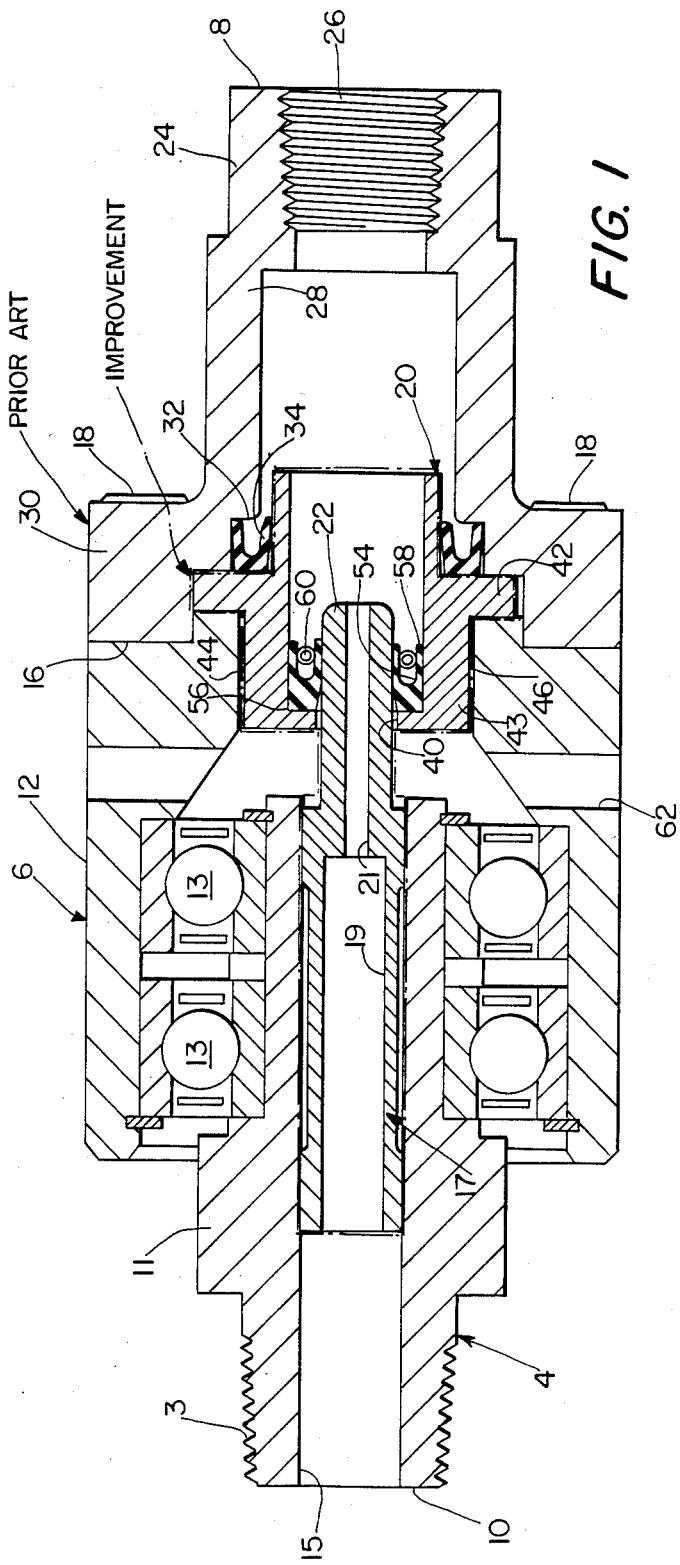
FIG. 1 is a cross sectional view of the present invention.

Referring to the figures, and more particularly FIG. 1 thereof, a rotating union in accordance with the present invention is indicated. As will be seen, a large portion of the device constitutes the prior art while the central seal arrangement constitutes the improvement of the present invention.

Reference numeral 6 generally indicates the union housing which encloses a shaft assembly generally indicated by reference numeral 4. The indicated right end 8 of the housing is connected to a fluid supply, such as a cryogenic source. A high pressure cryogenic gas passes through the union and exits at the left end 10 of the shaft assembly 4. The right end 8 remains stationary while the left end 10 rotates.

The shaft assembly 4 comprises a rotary outlet coupling 11 which has an external thread 3 to which an outlet pipe may be connected. A conventional ball bearing assembly, generally indicated by reference numeral 13, allows rotation of shaft assembly 4. The ball bearing assembly 13 is positioned within a first section 12 of housing 6. The rotary outlet coupling 11 includes an axially formed bore 15 through which cryogenic gas may pass. A step down cylindrical shaft member 17 is press fitted within the coupling bore 15. The shaft member 17 has an axially formed step down bore including the larger section 19 stepping down to the smaller section 21. The axially formed bore in the shaft member 17 permits cryogenic gas to pass therethrough between the inlet and outlet.

The shaft member 17 forms a first part of the improvement which constitutes the present invention. A second part of the improvement includes the sealing enclosure generally indicated by reference numeral 20. This enclosure receives the narrowed section 22 of shaft member 17 and is coaxial therewith. The seal enclosure 20 includes section 43 which is generally cylindrical having flattened surfaces 44 and 46 respectively located on the top and the bottom as clearly shown in FIG. 2. These flattened surfaces are designed to prevent rotation of the seal enclosure within the housing.

The enclosure 20 includes an annular shoulder 42 which is seated between adjacent surfaces of the first housing section 12 and the second housing section 30 to prevent axial displacement of the seal enclosure. The housing sections form an interface 16 and are secured together by fasteners 18. The right outward end 24 of the second housing section 30 includes an internally formed thread 26 to receive a mating high pressure supply pipe. The portion 28 of the second housing section 30 includes an annular recess 32 formed therein for receiving a ring seal 34. The sealing relationship between ring seal 34 and the recess 32 prevents leakage of incoming fluid between the housing and the seal enclosure 20.

Figure 2:
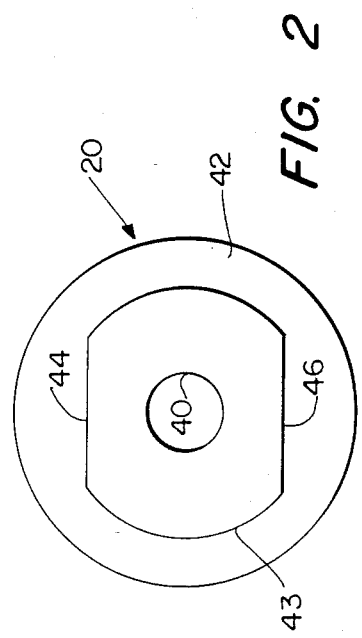
FIG. 2 is an end view of a seal enclosure utilized in the present invention.

As indicated in FIGS. 1 and 2, an axial opening 40 is formed in the seal enclosure 20 for receiving the right step down end of the shaft member 17. In order to create a vital seat between the confronting surfaces of the shaft member 17 and the seal enclosure 20, a second ring seal 58 is positioned within annular recess 56 which is formed inwardly of seal enclosure 20. The seal 58 is characterized by a generally U-shaped annular cross section wherein circular recess 54 receives a ring-shaped spring which maintains intimate low friction engagement between the seal 58 and the confronting surface of shaft member 17. In this respect the seal 58 may be considered to float as the shaft member 17 rotates and exhibits minor eccentric displacement which will commensurately cause displacement of seal 58 but due to spring 60, intimate engagement along the entire internal circumference of seal 58 is achieved. Thus, all of the gas delivered to the interior volume of seal enclosure 20 is prevented from leaking outwardly and is instead forced through bore sections 21 and 19 for delivery to bore 15 of outlet coupling 11. The ring and spring components 58, 60 are conventional in design and are manufactured by the Ball Seal Company of Tustin, California.

In order to prevent pressure damage to the ball bearing assembly 13, radial vents 62 are drilled through the housing section 12. Further, conventional grease fittings (not shown) may be formed in the housing.

According to the present invention, the modification of the prior art union by the shaft member 17, seal enclosure 20, ring seal 58, and spring member 60 produces a high pressure gas or liquid union which is light in weight and generates less friction at the shaft member-seal interface than that of the prior art. This results in the advantages previously discussed.

It should be understood that the invention is not limited to the exact details of construction shown and described herein for obvious modifications will occur to persons skilled in the art.

I claim:

1. A rotary union for fluids comprising:
   a housing;
   rotor means located in the housing and extending outwardly therefrom for coupling to an outlet conduit, the rotor means having a central bore formed therethrough;
   annular sealing means positioned within the housing and having a concentric groove formed therein;
   shaft means connected at a first end portion to the rotor means and positioned at a second end portion thereof in sealing engagement with the sealing means;
   means located in the groove for biasing the sealing means radially inwards for maintaining peripheral sealing engagement in response to minor eccentric motion of the shaft means;
   enclosure means keyed to the housing and located between the sealing means and the housing for receiving the sealing means;
   inlet means formed in the housing for receiving fluid for passage through the shaft means and rotor means to an outlet conduit; and
   second sealing means positioned between the enclosure and the housing for preventing leakage therebetween.

2. The structure set forth in claim 1 together with bearing means located between the rotor means and the housing for enabling rotation of the rotor relative to the housing.

3. The structure set forth in claim 2 together with vent means formed in the housing for preventing pressure damage to the bearing means.

4. The structure set forth in claim 1 wherein the biasing means is a ring shaped spring.

5. A rotary union for fluids comprising:
   a housing;
   rotor means located in the housing and extending outwardly therefrom for coupling to an outlet conduit, the rotor means having a central bore formed therethrough;
   annular sealing means positioned within the housing and having a concentric groove formed therein;
   shaft means connected at a first end portion to the rotor means and positioned at a second end portion thereof in sealing engagement with the sealing means;
   annular spring means located in the groove for biasing the sealing means radially inwards for maintaining peripheral sealing engagement in response to minor eccentric motion of the shaft means;
   enclosure means keyed to the housing and located between the sealing means and the housing for receiving the sealing means; and
   inlet means formed in the housing for receiving fluid for passage through the shaft means and rotor means to an outlet conduit.

6. The structure set forth in claim 5 together with bearing means located between the rotor means and housing for enabling rotation of the rotor relative to the housing.

7. The structure set forth in claim 6 together with vent means formed in the housing for preventing pressure damage to the bearing means.

8. The structure set forth in claim 5 together with second sealing means positioned between the enclosure and the housing for preventing leakage therebetween.

9. A rotary union for fluids comprising;
   a housing;
   rotor means located in the housing and extending outwardly therefrom for coupling to an outlet conduit, the rotor means having a central bore formed therethrough;
   annular sealing means positioned within the housing and having a concentric groove formed therein;
   shaft means connected at a first end portion to the rotor means and positioned at a second end portion thereof in sealing engagement with the sealing means;
   annular spring means located in the groove for biasing the sealing means radially inwards for maintaining peripheral sealing engagement in response to minor eccentric motion of the shaft means;
   enclosure means keyed to the housing and located between the sealing means and the housing for receiving the sealing means;
   inlet means formed in the housing for receiving fluid for passage through the shaft means and rotor means to an outlet conduit;
   bearing means located between the rotor means and the housing for enabling rotation of the rotor relative to the housing;
   vent means in the housing for preventing pressure damage to the bearing means; and
   second sealing means positioned between the enclosure and the housing for preventing leakage therebetween.

* * * * *